United States Patent [19]
Wagner

[11] Patent Number: 5,905,915
[45] Date of Patent: May 18, 1999

[54] FRANGIBLE PORTION OF ONE-TIME-USE CAMERA MUST BE BROKEN TO OPEN CAMERA, WHICH LEAVES HOLD TO DISCOURAGE UNAUTHORIZED RECYCLING

[75] Inventor: Bernd Wagner, North Greece, N.Y.

[73] Assignee: Eastman Kodak Company, Rochester, N.Y.

[21] Appl. No.: 08/861,876

[22] Filed: May 22, 1997

[51] Int. Cl.⁶ ..................................................... G03B 17/02
[52] U.S. Cl. ........................................................... 396/6
[58] Field of Search .................................................. 396/6

[56] References Cited

U.S. PATENT DOCUMENTS

| | | |
|---|---|---|
| 1,263,228 | 4/1918 | Goddard et al. . |
| 3,490,348 | 1/1970 | Ariyasu et al. . |
| 4,077,041 | 2/1978 | Imura . |
| 4,650,304 | 3/1987 | Harvey . |
| 4,928,900 | 5/1990 | Beery . |
| 5,187,514 | 2/1993 | Ikenoue . |
| 5,280,237 | 1/1994 | Stoneham et al. . |
| 5,349,410 | 9/1994 | Kamata . |

Primary Examiner—David M. Gray
Attorney, Agent, or Firm—Roger A. Fields

[57] ABSTRACT

A one-time-use camera comprising a main body part, and a cover part connected to the main body part which at least partially covers the main body part, is characterized in that a continuous line of weakness circumscribes a predetermined portion of the main body part or cover part to permit the predetermined portion to be broken away from the main body part or cover part along the continuous line of weakness and leave a hole in the main body part or cover part in the place of the predetermined portion, and the cover part is connected to the main body part at the predetermined portion to cause the predetermined portion to be broken away from the main body part or cover part when the main body part and the cover part are forcibly pulled apart.

15 Claims, 9 Drawing Sheets

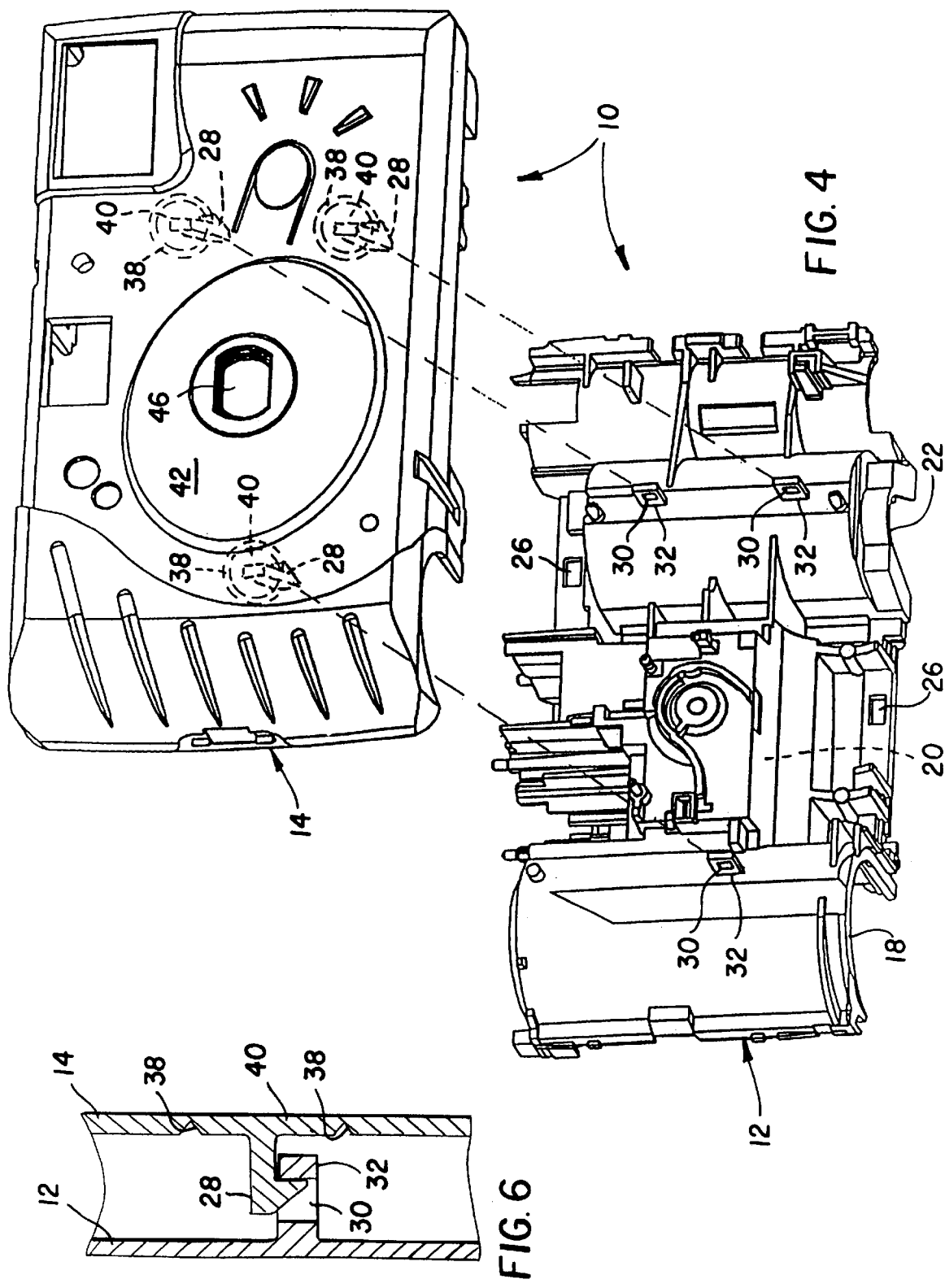

FRANGIBLE PORTION OF ONE-TIME-USE CAMERA MUST BE BROKEN TO OPEN CAMERA, WHICH LEAVES HOLD TO DISCOURAGE UNAUTHORIZED RECYCLING

CROSS-REFERENCE TO RELATED APPLICATIONS

Reference is made to commonly assigned copending applications Ser. No. 08/862,205, entitled ONE-TIME-USE CAMERA CAN ONLY BE USED WITH MODIFIED FILM CARTRIDGE, TO PREVENT UNAUTHORIZED REUSE WITH STANDARD FILM CARTRIDGE and filed May 22, 1997 in the names of Jude A. SanGregory, Edgar G. Earnhart and Joseph C. Weiser, and Ser. No. 08/862,119, entitled METHOD OF REMANUFACTURING ONE-TIME-USE CAMERA and filed May 22, 1997 in the name of Bernd Wagner.

FIELD OF THE INVENTION

The invention relates generally to the field of photography, and in particular to one-time-use cameras. More specifically, the invention relates to a one-time-use camera having a frangible portion that must be broken to open the camera, which leaves a hole to discourage unauthorized recycling of the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each time a picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting, and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

Prior Art Problem

There is a need recognized in the industry to prevent unauthorized recycling (remanufacturing) of one-time-use cameras in order to maintain camera quality. Unauthorized recycled cameras may be of lesser quality than authorized recycled cameras because the reused parts may be worn or damaged. This problem is further described in U.S. Pat. No. 5,452,033 issued Sep. 19, 1995 and U.S. Pat. No. 5,235,366 issued Aug. 10, 1993.

One example of a possible solution to the problem is disclosed in prior art U.S. Pat. No. 5,349,410 issued Sep. 20, 1994. This patent suggests as a way to prevent unauthorized recycling that an anti-backup pawl for the thumbwheel be broken when the rear cover part is separated from the main body part to obtain the film cartridge from the cartridge receiving chamber. The rear cover part has a projecting hook that extends through a hole in the anti-backup pawl to engage the pawl. The anti-backup pawl is connected to the main body part at a location which includes a weakened notch section. Thus, separating the rear cover part from the main body part breaks the anti-backup pawl away from the main body part at the weakened notch section.

Another example of a possible solution to the problem is for the rear cover part to have an integral door portion that is to be opened to remove the film cartridge from the cartridge receiving chamber and to have a grooved line of weakness between the door portion and a remaining portion of the rear cover part. The grooved line of weakness forms a living hinge between the door portion and the remaining portion of the rear cover part which tends to fracture when the door portion is opened. The fracture allows the door portion to be readily separated from the remaining portion of the rear cover part, to leave a large opening to the main body part which allows ambient light to enter the cartridge receiving chamber. The fracture, often however, may not be sufficient to readily separate the door portion from the remaining portion of the rear cover part. Consequently, the rear cover part might be reused, provided an opaque tape is adhered to the fractured line of weakness to prevent any possible light leak.

The Cross-referenced Applications

Cross-referenced application Ser. No. 08/862,205 discloses a further example of a possible solution to the problem. In this instance, the film cartridge is a modified cartridge as compared to a standard cartridge, because it has a recess that is not on the standard cartridge. The main body part has a blocking protuberance that projects into the cartridge receiving chamber to fit in the recess when the modified cartridge is placed in the chamber, but which will abut the standard cartridge to prevent it from being placed in the chamber when one attempts to substitute the standard cartridge for the modified cartridge. A hollowed-out space is provided in the blocking protuberance that will allow ambient light to leak into the cartridge receiving chamber should one cut the protuberance off the main body part at the hollowed-out space in order to permit the standard cartridge to be placed in the chamber.

Cross-referenced application Ser. No. 08/862,119 discloses a method of remanufacturing the one-time-use camera disclosed in this application.

SUMMARY OF THE INVENTION

According to the invention, a one-time-use camera comprising a main body part, and a cover part connected to the main body part which at least partially covers the main body part, is characterized in that:

a continuous line of weakness circumscribes a predetermined portion of the main body part or cover part to permit the predetermined portion to be broken away from the main body part or cover part along the continuous line of weakness and leave a hole in the main body part or cover part in the place of the predetermined portion; and the cover part is connected to the main body part at the predetermined portion to cause the predetermined portion to be broken away from the main body part or cover part when the main body part and the cover part are forcibly pulled apart.

More particularly, the main body part and the cover part define a chamber between them which is light-tight, and the predetermined portion is a portion of the cover part that at least partially defines the chamber to allow ambient light to enter the light-tight chamber through the hole when the predetermined portion is broken away from the cover part along the continuous line of weakness.

BRIEF DESCRIPTION OF THE DRAWINGS

FIG. 4 is an exploded front perspective view of the main body part and a front cover part;

FIG. 6 is a sectional view of a hook projecting from the front cover part through an opening in a lug on the main body part;

DETAILED DESCRIPTION OF THE INVENTION

Figure 1:
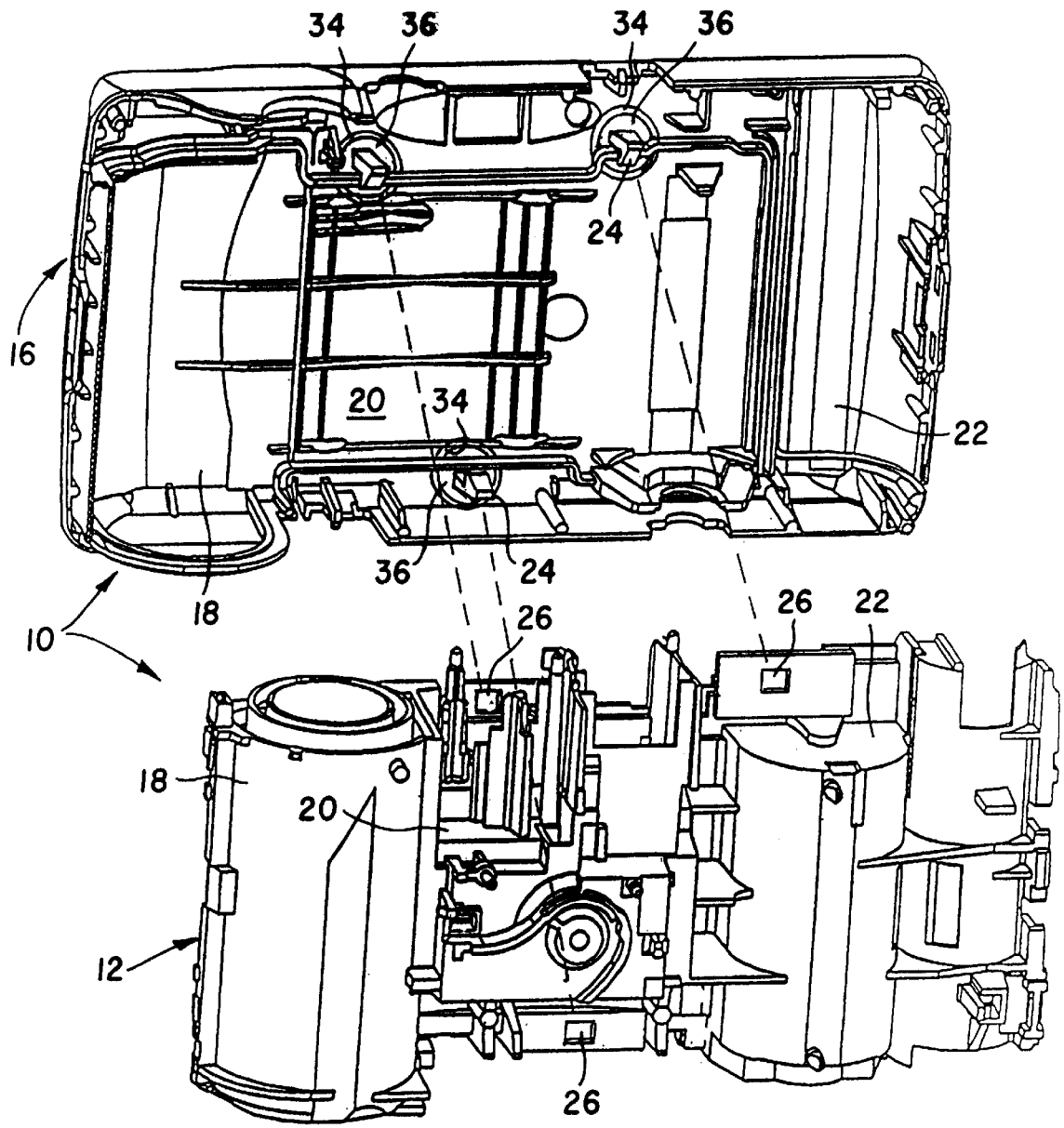
FIG. 1 is an exploded front perspective view of a main body part and a rear cover part of a one-time-use camera pursuant to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment

Referring now to the drawings, FIGS. 1, 2, 4 and 5 show a one-time-use camera 10 comprising a main body part 12 and a pair of front and rear cover parts 14 and 16 which house the main body part between them. The main body part 12 and the rear cover part 16 define a cartridge-receiving chamber 18, a film exposure chamber 20 and an unexposed film roll chamber 22 which are each enclosed between the main body part and the rear cover part.

Figure 3:
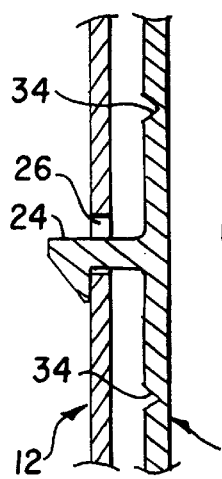
FIG. 3 is a sectional view of a hook projecting from the rear cover part through an opening in the main body part to connect the rear cover part and the main body part together.
Figure 2:
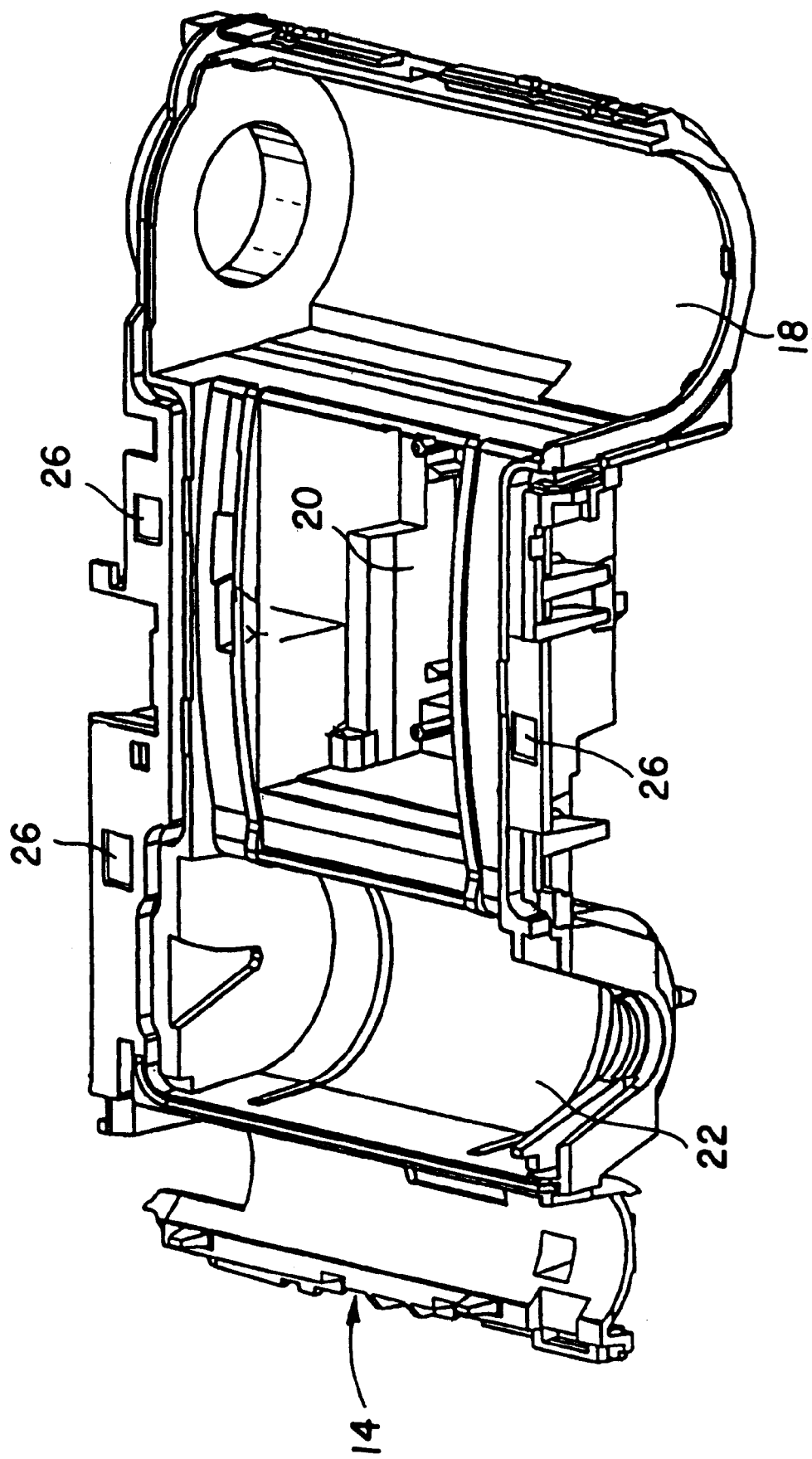
FIG. 2 is a rear perspective view of the main body part.

As shown in FIGS. 1 and 3, the rear cover part 16 has three inside-projecting, identical, flexible hooks 24 which protrude tightly through respective rectangular openings 26 in the main body part 12 to connect the rear cover part and the main body part together to light-tightly seal the cartridge-receiving chamber 18, the film exposure chamber 20 and then unexposed film roll chamber 22.

Figure 5:
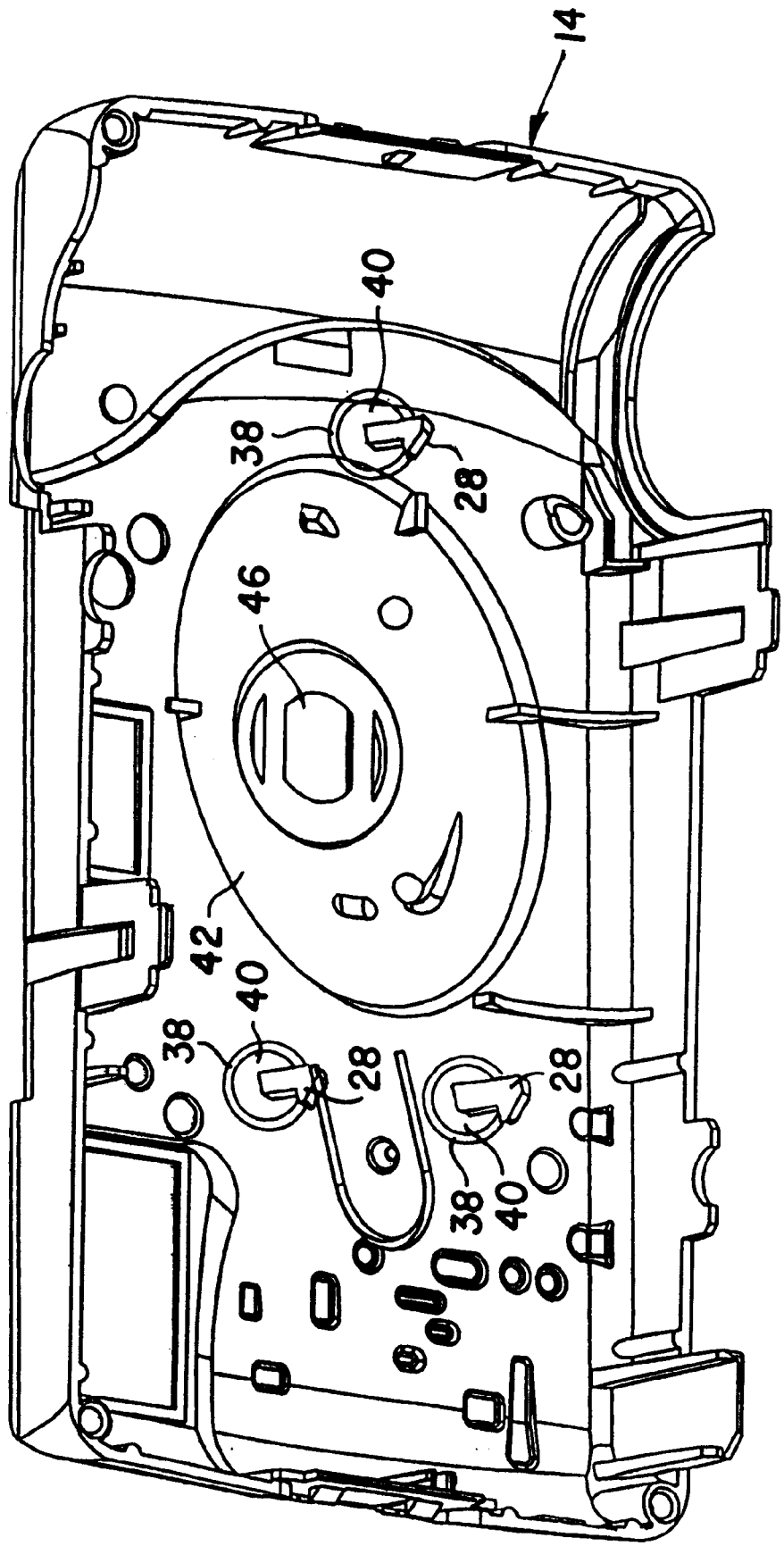
FIG. 5 is a rear perspective view of the front cover part.

As shown in FIGS. 4–6, the front cover part 14 has three inside-projecting, identical, flexible hooks 28 which protrude tightly through respective rectangular openings 30 in three integral front lugs 32 of the main body part 12 to connect the front cover part and the main body part together with the hooks and the lugs concealed between the front cover part and the main body part to prevent them from being manually disengaged.

Three rear lugs (not shown), identical to the three front lugs 32 on the main body part 12, can be provided on the main body part instead of the three rectangular openings 26 in the main body part, in order for the hooks 24 of the rear cover part 16 to connect the rear cover part to the main body part. This would be done to conceal the three hooks 24 and the three lugs (not shown) between the rear cover part 16 and the main body part 12 to prevent them from being manually disengaged (similar to the three hooks 28 and the three lugs 32).

Three inside-grooved continuous lines of weakness 34 circumscribe respective circular portions 36 of the rear cover part 16 that include the three hooks 24. See FIGS. 1 and 3. The three circular portions 36 partially cover the film exposure chamber 20 to make that chamber light-tight. If the rear cover part 16 is forcibly pulled apart from the main body part 12 to begin to disassemble the camera 10, the three circular portions 36 will be instantly torn away from the rear cover part along the three lines of weakness 34 because the three hooks 24 remain engaged with the main body part at the respective rectangular openings 26 in the main body part.

Thus, three holes will be created in the rear cover part 16 in place of the three circular portions 36. The three holes prevent the rear cover part 16 from being reconnected to the main body part 12 at the respective circular portions 36, and they allow ambient light to enter the film exposure chamber 20 should one attempt to reconnect the rear cover part to the main body part using other means.

One can, of course, somehow plug or cover the three holes in the rear cover part 16 to remanufacture the rear cover part, but it is clearly preferable in order to maintain quality to replace the spent part with a new suitable part.

Three inside-grooved continuous lines of weakness 38 circumscribe respective circular portions 40 of the front cover part 14 that include the three hooks 28. See FIGS. 4–6. If the front cover part 14 is forcibly pulled apart from the main body part 12 to continue to disassemble the camera 10, the three circular portions 40 will be instantly torn away from the front cover part along the three lines of weakness 38 because the three hooks 28 remain engaged with the main body part at the respective rectangular openings 30 in the three lugs 32 of the main body part. Thus, three holes will be created in the front cover part 14 in place of the respective circular portions 40, which prevent the front cover part from being reconnected to the main body part 12 at the three circular portions.

Alternate Embodiment #1

Figure 7:
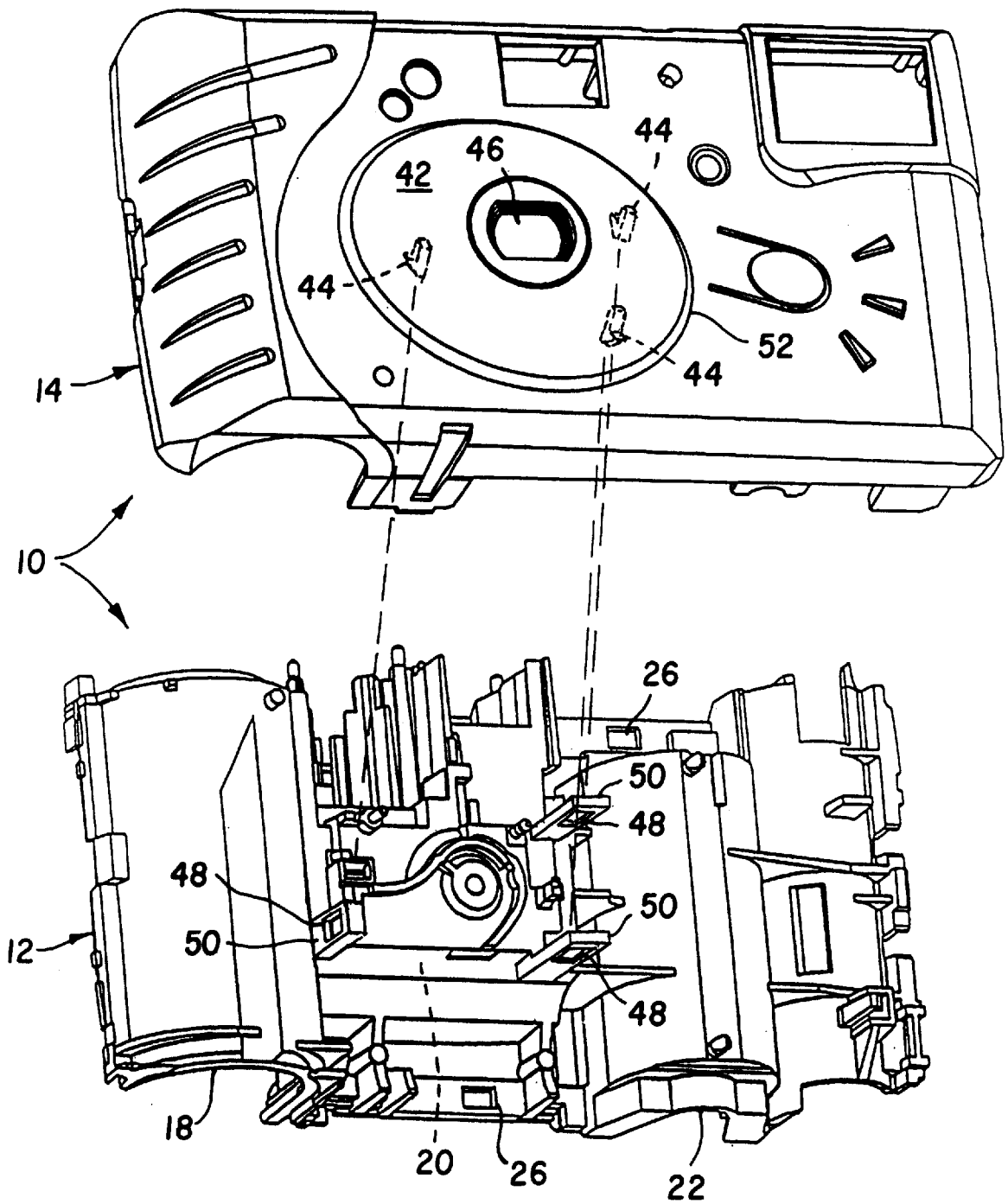
FIG. 7 is an exploded front perspective view similar to FIG. 4, but of an alternate embodiment of a lens bezel on the front cover part.
Figure 8:
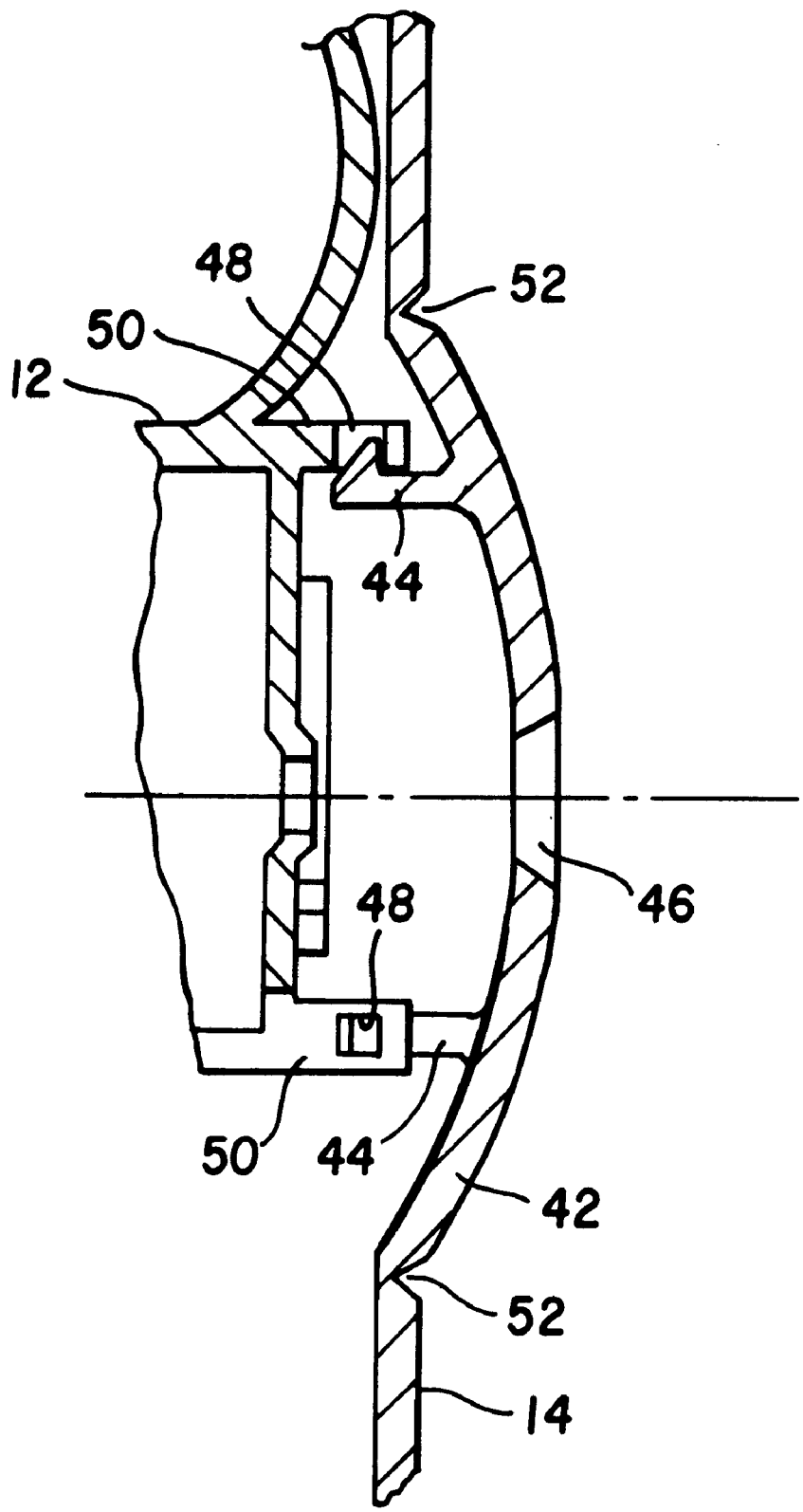
FIG. 8 is a sectional view of hooks projecting from the lens bezel through openings in respective lugs on the main body part.

FIGS. 7 and 8 show a first alternate embodiment in which instead of the front cover part 14 having the three hooks 28 and the main body part 12 having the three lugs 32 with the rectangular openings 30, to connect the front cover part and the main body part together, the front cover part includes an outside-raised oval-shaped lens bezel 42 having three inside-projecting, identical, flexible hooks 44 which surround a centered lens opening 46 in the lens bezel, and the main body part has respective rectangular openings 48 in three integral front lugs 50 of the main body part 12. The three hooks 44 protrude through the respective openings 48 in the three lugs 50 to connect the front cover part 14 and the main body part 12 together with the hooks and the lugs concealed between the front cover part and the main body part to prevent them from being manually disengaged.

A single outside-grooved continuous line of weakness 52 circumscribes the lens bezel 42. See FIGS. 7 and 8. If the front cover part 14 is forcibly pulled apart from the main body part 12 to continue to disassemble the camera 10, the lens bezel 42 will be instantly torn away from the front cover part along the line of weakness 52 because the three hooks 44 remain engaged with the main body part at the respective rectangular openings 48 in the three lugs 50 of the main body part. Thus, a single hole will be created in the front cover part 14 in place of the lens bezel 42, which prevents the front cover part from being reconnected to the main body part 12 at the lens bezel.

Alternate Embodiment #2

Figure 9:
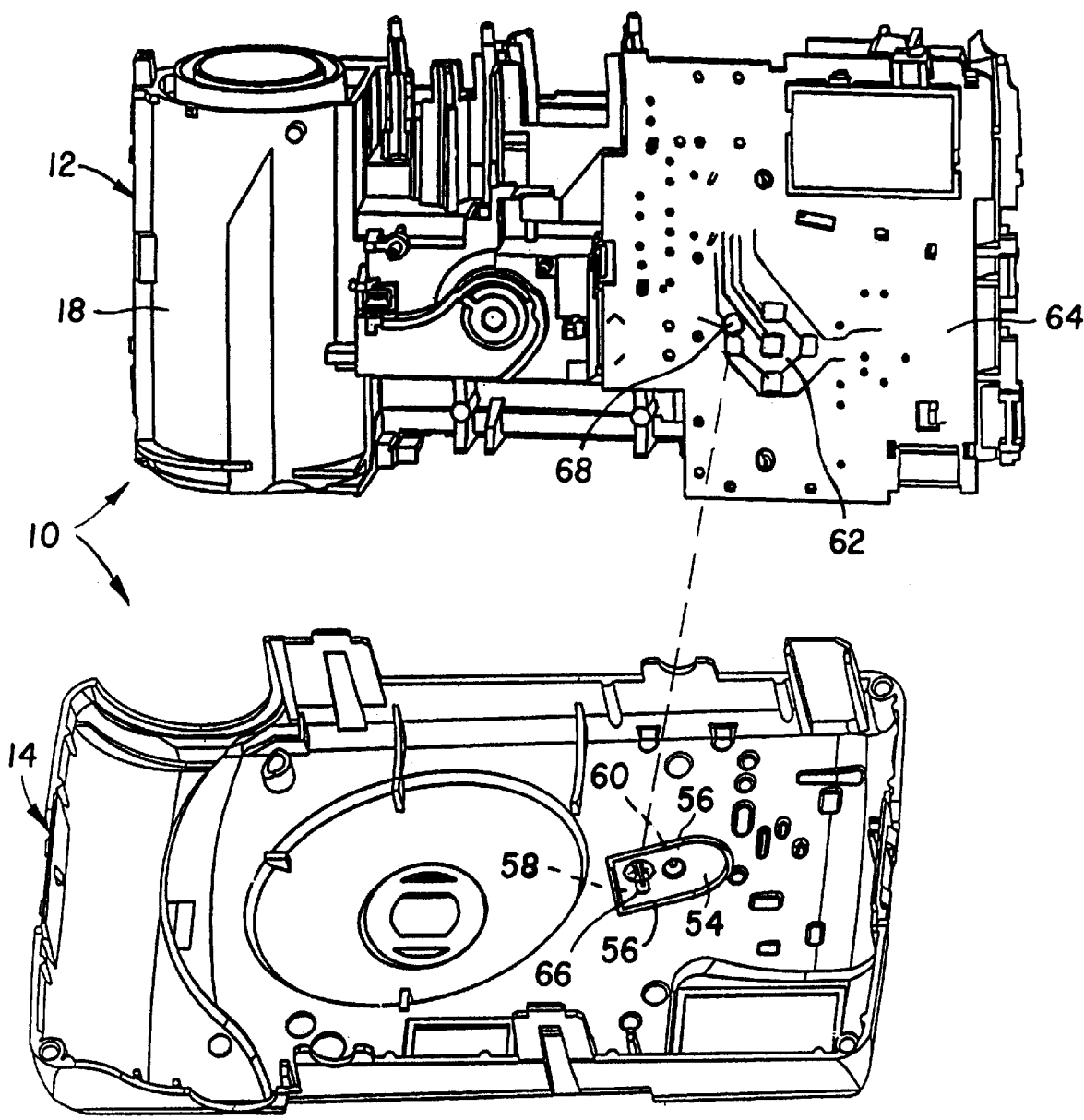
FIG. 9 is an exploded front perspective view similar to FIG. 4, but of an alternate embodiment of a manually depressible flash button on the front cover part.
Figure 10:
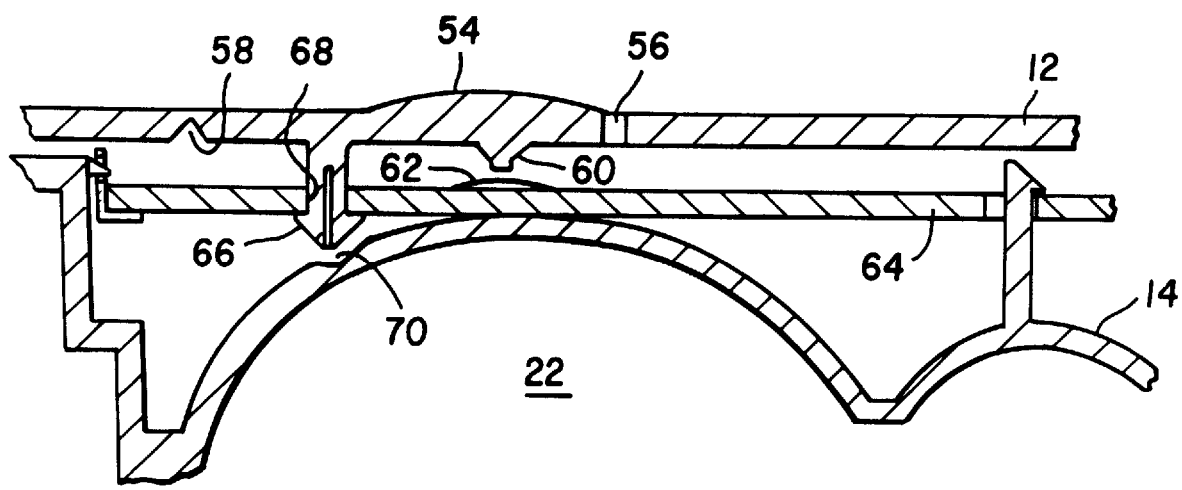
FIG. 10 is a sectional view of a hook projecting from the flash button through an opening in a flash circuit board affixed to the main body part.

FIGS. 9 and 10 show a second alternate embodiment in which the front cover part 14 has an integral cantilevered flash button 54 which is surrounded on three sides by a slot 56 through the front cover part. At the remaining side of the flash button 54, there is provided a single inside-grooved straight line of weakness 58 in the front cover part 12. The slot 56 and the line of weakness 58 together circumscribe the flash button 54 end-to-end. See FIG. 9.

When the flash button 54 is manually depressed, a protuberance 60 on its underside depresses a resilient dome switch 62 on a flash circuit board 64 affixed to the main body part 12 opposite the unexposed film roll chamber 22. This prepares the flash circuit board 64 in a known way for flash picture-taking.

The flash button 54 has a single inside-projecting flexible hook 66 that protrudes movably (loosely) through a circular opening 68 in the flash circuit board 64 to couple the flash button and the flash circuit to in turn couple the front cover part 14 and the main body part 12. The hook 66 and the circular opening 68 are concealed between the main body part 12 and the front cover part 14 to prevent the hook and the flash circuit board 64 from being manually uncoupled. A clearance space 70 is located between the hook 66 and the main body part 12 to provide room for the hook when the flash button 54 is manually depressed. See FIG. 10.

If the front cover part 14 is forcibly pulled apart from the main body part 12 to continue to disassemble the camera 10, the flash button 54 will be instantly torn away from the front cover part along the line of weakness 58 because the hook 66 remains engaged with the flash circuit board 64 at the circular opening 68 in the flash circuit board. Thus, a single hole will be created in the front cover part 14 in place of the flash button 54 and the flash button will be permanently disabled.

Alternate Embodiment #3

Figure 11:
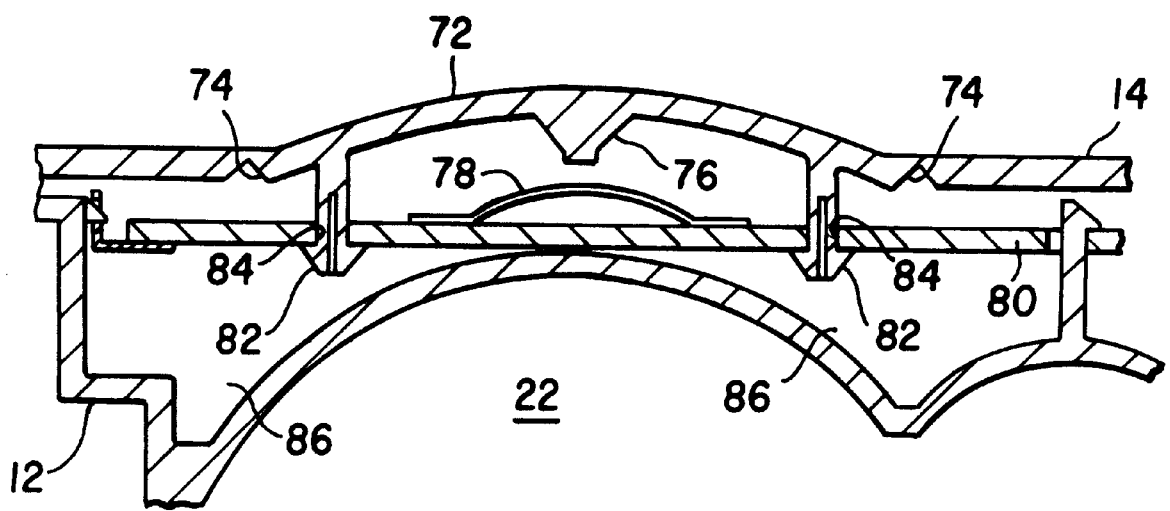
FIG. 11 is a sectional view similar to FIG. 10, but of another embodiment of the flash button.

FIG. 11 shows a third alternate embodiment in which the front cover part 14 has an integral resilient dome-like flash button 72 which is circumscribed by a single inside-grooved continuous line of weakness 74 in the front cover part 12.

When the flash button 72 is manually depressed, a protuberance 76 on its underside depresses a resilient dome switch 78 on a flash circuit board 80 affixed to the main body part 12 opposite the unexposed film roll chamber 22. This prepares the flash circuit board 80 in a known way for flash picture-taking.

The flash button 72 has two inside-projecting, identical, flexible hooks 82 that protrude movably (loosely) through respective circular openings 84 in the flash circuit board 80 to couple the flash button and the flash circuit to in turn couple the front cover part 14 and the main body part 12. The two hooks 82 and the two circular openings 84 are concealed between the main body part 12 and the front cover part 14 to prevent the hooks and the flash circuit board 80 from being manually uncoupled. Two clearance spaces 86 are located between the hooks 82 and the main body part 12 to provide room for the hooks when the flash button 72 is manually depressed. See FIG. 10.

If the front cover part 14 is forcibly pulled apart from the main body part 12 to continue to disassemble the camera 10, the flash button 72 will be instantly torn away from the front cover part along the line of weakness 74 because the two hooks 82 remain engaged with the flash circuit board 80 at the two circular openings 84 in the flash circuit board. Thus, a single hole will be created in the front cover part 14 in place of the flash button 72 and the flash button will be permanently disabled.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part 14. front cover part
16. rear cover part
18. cartridge receiving chamber
20. film exposure chamber
22. unexposed film roll chamber
24. three hooks
26. three rectangular openings
28. three hooks
30. three rectangular openings
32. three lugs
34. three inside-grooved continuous lines of weakness
36. three circular portions
38. three inside-grooved continuous lines of weakness
40. three circular portions
42. lens bezel
44. three hooks
46. lens opening
48. three rectangular openings
50. three lugs
52. outside-grooved continuous line of weakness
54. cantilevered flash button
56. slot
58. inside-grooved straight line of weakness
60. protuberance
62. dome switch
64. flash circuit board
66. hook
68. circular opening
70. clearance space
72. dome-like flash button
74. inside-grooved continuous line of weakness
76. protuberance
78. dome switch
80. flash circuit board
82. two hooks
84. two circular openings
86. two clearance spaces

What is claimed is:

1. A one-time-use camera comprising a main body part, and a cover part connected to said main body part which at least partially covers the main body part, is characterized in that:

a continuous line of weakness circumscribes a predetermined portion of said main body part or cover part to permit said predetermined portion to be broken away from the main body part or cover part along said continuous line of weakness and leave a hole in the main body part or cover part in the place of the predetermined portion; and said cover part is connected to said main body part at said predetermined portion to cause the predetermined portion to be broken away from the main body part or cover part when the main body part and the cover part are forcibly pulled apart.

2. A one-time-use camera as recited in claim 1, wherein said predetermined portion includes a functional element that is capable of performing a particular function and is broken away from said main body part or cover part with the predetermined portion along said continuous line of weakness in order to be disabled to prevent performance of the particular function.

3. A one-time-use camera as recited in claim 1, wherein said predetermined portion is a portion of said cover part and includes a manually operable member that is manually operated to perform the particular function and is broken away from the cover part with the predetermined portion along said continuous line of weakness.

4. A one-time-use camera as recited in claim 3, wherein said manually operable member is a manually depressible button.

5. A one-time-use camera as recited in claim 3, wherein said predetermined portion and said main body part include respective engagement members for connecting the main body part and said cover part and which are concealed between the main body part and the predetermined portion to prevent the main body part and the cover part from being disconnected and which cause the predetermined portion to be broken away from the cover part along said continuous line of weakness when the main body part and the cover part are forcibly pulled apart.

6. A one-time-use camera as recited in claim 1, wherein said predetermined portion is a portion of said cover part and has a lens opening.

7. A one-time-use camera as recited in claim 1, wherein said main body part and said cover part define a chamber between them which is light-tight, and said predetermined portion is a portion of said cover part that at least partially defines said chamber to allow ambient light to enter the light-tight chamber through said hole when the predetermined portion is broken away from the cover part along said continuous line of weakness.

8. A one-time-use camera as recited in claim 1, wherein said main body part and said cover part include a pair of mutually engaged members which connect the main body part and the cover part and are concealed between the main body part and the cover part to prevent said pair of engaged members from being disengaged, and only one of said pair of engaged members is connected to said predetermined portion to cause the predetermined portion to be broken away from said main body part or cover part along said continuous line of weakness when the main body part and the cover part are forcibly pulled apart.

9. A one-time-use camera comprising a main body part, and a cover part connected to said main body part which at least partially covers the main body part, is characterized in that:

an end-to-end slot and line of weakness in said cover part which together circumscribe a predetermined portion of the cover part to permit said predetermined portion to be broken away from the cover part along said line of weakness to leave a hole in the cover part in the place of the predetermined portion; and said cover part is connected to said main body part at said predetermined portion to cause the predetermined portion to be broken away from the cover part when the main body part and the cover part are forcibly pulled apart.

10. A one-time-use camera as recited in claim 9, wherein said predetermined portion includes a manually operable member that is broken away from said cover part with the predetermined portion along said line of weakness.

11. A one-time-use camera as recited in claim 10, wherein a flash circuit board is affixed to said main body part, said manually operable member is a manually depressible flash button, and said predetermined portion and said flash circuit board include respective mutually engaging members which connect said cover part and said flash circuit board to in turn connect the cover part and said main body part and are concealed between the main body part and the predetermined portion to prevent said mutually engaging members from being disengaged and which cause the predetermined portion to be broken away from the cover part along said continuous line of weakness when the main body part and the cover part are forcibly pulled apart.

12. A one-time-use camera comprising a main body part having a chamber, and a cover part connected to said main body part which covers said chamber to make the chamber light-tight and has a weakened portion that can be separated from a remaining portion of the cover part to leave an opening to the chamber in place of the separated portion, is characterized in that:

said weakened portion of the cover part is connected to said main body part to cause the weakened portion to be separated from said remaining portion of the cover part when the main body part and said cover part are forcibly pulled apart.

13. A one-time-use camera as recited in claim 12, wherein said main body part and said weakened portion of the cover part include a pair of mutually engaged members which connect the main body part and the cover part and are concealed between the main body part and the weakened portion to prevent said pair of engaged members from being disengaged and which cause the weakened portion to be separated from said remaining portion of the cover part when the main body part and the cover part are forcibly pulled apart.

14. A cover part intended to at least partially cover a main body part of a one-time-use camera, is characterized in that:

a continuous line of weakness circumscribes a predetermined portion of said cover part to permit said predetermined portion to be broken away from the cover part along said continuous line of weakness and leave a hole in the cover part in the place of the predetermined portion; and an engagement member of said cover part is configured to be connected to the main body part at said predetermined portion to cause the predetermined portion to be broken away from the main body part when the main body part and the cover part are forcibly pulled apart.

15. A cover part adapted to be connected to a main body part of a one-time-use camera to cover a chamber in the main body part to make the chamber light-tight and having a weakened portion that can be separated from a remaining portion of said cover part to leave an opening to the chamber in place of the separated portion, is characterized in that:

said weakened portion of the cover part has an engagement member configured to be connected to the main body part to cause the weakened portion to be separated from said remaining portion of the cover part when the main body part and said cover part are forcibly pulled apart.

* * * * *

UNITED STATES PATENT AND TRADEMARK OFFICE
CERTIFICATE OF CORRECTION

PATENT NO. : 5,905,915
DATED : May 18, 1999
INVENTOR(S) : Bernd Wagner

It is certified that error appears in the above-indentified patent and that said Letters Patent is hereby corrected as shown below:

On the title page, item [54] and Column 1, in the title

-- FRANGIBLE PORTION OF ONE-TIME-USE CAMERA MUST BE BROKEN TO OPEN CAMERA, WHICH LEAVES HOLE TO DISCOURAGE UNAUTHORIZED RECYCLING --
-- FRANGIBLE PORTION OF ONE-TIME-USE CAMERA MUST BE BROKEN TO OPEN CAMERA, WHICH LEAVES HOLE TO DISCOURAGE UNAUTHORIZED RECYCLING --

Signed and Sealed this

Twelfth Day of October, 1999

Attest:

Q. TODD DICKINSON

*Attesting Officer*         *Acting Commissioner of Patents and Trademarks*